(12) United States Patent
Ishigai et al.

(10) Patent No.: US 7,644,012 B2
(45) Date of Patent: Jan. 5, 2010

(54) CONTACTPOINT NAVIGATION SYSTEMS AND RECORDING/TRANSMISSION MEDIA ON WHICH THE CONTACTPOINT MANAGEMENT METHOD IS RECORDED AND TRANSMITTED

(75) Inventors: Satoshi Ishigai, Minato-ku (JP); So Ninomiya, Minato-ku (JP)

(73) Assignee: Dentsu, Inc., Minato-Ku, Tokyo (JP)

( * ) Notice: Subject to any disclaimer, the term of this patent is extended or adjusted under 35 U.S.C. 154(b) by 787 days.

(21) Appl. No.: 10/558,455

(22) PCT Filed: May 28, 2003

(86) PCT No.: PCT/JP03/06666

§ 371 (c)(1),
(2), (4) Date: Apr. 17, 2006

(87) PCT Pub. No.: WO2004/107232

PCT Pub. Date: Dec. 9, 2004

(65) Prior Publication Data

US 2006/0253291 A1   Nov. 9, 2006

(51) Int. Cl.
G06Q 30/00   (2006.01)
(52) U.S. Cl. ........................................................ 705/14
(58) Field of Classification Search .................... 705/14
See application file for complete search history.

(56) References Cited

U.S. PATENT DOCUMENTS

| | | | |
|---|---|---|---|
| 6,286,005 B1 * | 9/2001 | Cannon | 707/100 |
| 6,334,109 B1 | 12/2001 | Kanevsky | |
| 7,043,433 B2 * | 5/2006 | Hejna, Jr. | 704/270 |
| 2002/0013729 A1 * | 1/2002 | Kida | 705/14 |
| 2002/0083435 A1 * | 6/2002 | Blasko et al. | 725/14 |
| 2002/0104083 A1 * | 8/2002 | Hendricks et al. | 725/34 |

(Continued)

FOREIGN PATENT DOCUMENTS

JP   01/82160 A1   11/2001

(Continued)

OTHER PUBLICATIONS

Hirono, Y., "The Johogen," Dai 43 Kai, I.M. Press 42:66-70 (1999).

(Continued)

Primary Examiner—James W Myhre
(74) Attorney, Agent, or Firm—Nixon Peabody LLP

(57) ABSTRACT

It is desirable to provide systems that select prospective consumer contact points producing high advertising effects and that carry out navigation for distribution of a budget among the contact points, taking into account every opportunity to introduce brand information to prospective consumers.

The present invention provides methods and systems that accomplish the above objectives by determining purchase processes that correspond to article types, setting phases appropriate to the purchase processes, determining time slots suitable for contacting targets for each phase, and selecting ContactPoints that produce a high advertising effect, for each phase, on the basis of ContactPoint power for each phase calculated on the basis of a ContactPoint potential index, a ContactPoint-wise contact rate index, a ContactPoint/mood affinity index, and the like.

31 Claims, 8 Drawing Sheets

U.S. PATENT DOCUMENTS

2002/0165923 A1* 11/2002 Prince ........................ 709/206
2004/0073484 A1* 4/2004 Camporeale et al. .......... 705/14
2006/0252016 A1* 11/2006 Terasawa .................... 434/238

FOREIGN PATENT DOCUMENTS

| JP | 2001-312629 | A1 | | 11/2001 |
| JP | 2002-024525 | A | * | 1/2002 |
| JP | 2003-44738 | A1 | | 2/2003 |

OTHER PUBLICATIONS

Ishigai, S.,"To Leverage on Points of Contact Between Brands and Customers," Advertising 8:56-65 (2003).

Setoguchi, K., "Kokoku Kaisha ni okeru OR no Tekiyo Jirei," Keiei no Kagaku, Communications of the Operations Research Society of Japan, 42(5):277-280 (1997).

* cited by examiner

CONTACTPOINT NAVIGATION SYSTEMS AND RECORDING/TRANSMISSION MEDIA ON WHICH THE CONTACTPOINT MANAGEMENT METHOD IS RECORDED AND TRANSMITTED

This application is a national stage application under 35 U.S.C. §371 from PCT Application No. PCT/JP03/06666, filed May 28, 2003.

TECHNICAL FIELD

The present invention relates to navigation methods and systems for suitable ContactPoints between communication targets (brands) and prospective consumers, and recording media on which the methods are recorded, and transmission media for transmitting the methods.

Herein, "ContactPoint navigation" includes not only selection and determination of ContactPoints, but also distribution of communication budgets (advertising budgets) among the selected and determined ContactPoints, as well as selection and determination of vehicles and distribution of communication budgets (advertising budgets) among the vehicles.

BACKGROUND ART

Conventional selection of advertising spots is mostly dependent on the experience of advertising agency personnel, and selection has mostly been manually performed. However, in recent years, advertising media have diversified, and selecting which vehicles to place advertisements in from among these respective advertising media can be very complicated.

As a reflection of these circumstances, various support tools for advertising spot selection have already been proposed to ease the workload for advertising agency personnel. For example, Japanese Patent Application Kokai Publication No. (JP-A) 2002-24525 proposes a method and system for selecting advertising spots across a number of advertising media, in which, on the basis of data on the probability of contact between consumers and each advertising media, advertising spots are sequentially selected for each advertising media type within the limits of acquisition cost, so as to maximize total contact probability divided by the acquisition cost for the advertising spot.

The method for selecting advertising spots illustrated in JP-A 2002-24525 is what is called a "reach preferred" type: the method gives top priority to the efficiency with which an advertisement reaches consumers. Increasing the number of times that an advertisement reaches consumers is expected to indirectly improve the corresponding advertising effect of a particular brand.

However, advertisers tend to be dissatisfied with the indirect advertising effect that can be achieved using this "reach preferred" method of selecting advertising spots, and tend to prefer advertising spot selections that are expected to produce a reliable advertising effect Thus, advertising agencies must present advertisers with a plan for selecting advertising spots that improves the advertising effect, instead of one that simply exposes a large audience to the advertisement. Moreover, in order to persuade advertisers, advertising agencies must also prepare data that backs up the advertising effect.

DISCLOSURE OF THE INVENTION

The above-described method of advertising spot selection, illustrated in Japanese Patent Application Kokai Publication No. (JP-A) 2002-24525 is configured to select advertising spots substantially on the basis of contact probability. Consequently, although acquisition costs are distributed among advertising spots so as to maximize reach efficiency, such advertising spot selection is not guaranteed to produce the best advertising effect. This is because maximum efficiency of consumer access does not necessarily coincide with maximum advertising effect.

Specifically, as those skilled in the art know from experience, even if a certain advertisement reaches different consumers in the same way, the effect of that advertisement on the individual consumers, who are receivers of the advertisement, varies significantly depending on their current situation or mood. The advertising effect cannot be determined by contact probability alone, although contact probability does serve as one important index.

Furthermore, in the method of advertising spot selection illustrated in JP-A 2002-24525, selections are basically made for each advertising media type, and expense distribution between the advertising media types is precisely adjusted so as not to exceed total budget limitations at the end. Consequently, when selecting advertising spots within the same type of advertising media, the contact probability per acquisition cost is maximized. However, when selecting advertising spots over a number of advertising media types, the maximum contact probability per acquisition cost is not guaranteed.

The contact probabilities on which selections are based have a scale varying with the advertising media For example, audience ratings for TV cannot be simply compared with listener ratings for radio. Thus, it is impossible to equally compare the advertising effects of individual advertising vehicles in different advertising media types on the basis of contact probability.

Therefore, the method of advertising spot selection illustrated in Japanese Patent Application Kokai Publication No. (JP-A) 2002-24525 is a very useful tool for advertising agency personnel, but in this coming era of "effect preferred" type advertising selection, it is not guaranteed to facilitate the selection of advertising spots that sufficiently satisfy advertisers.

The present inventors have analytically determined that advertising effect is affected by four factors: the "time", "place", "scene", and "mood" when an advertisement reaches consumers. An index determined by contact probability coupled with the effects of these four factors can enable suitably accurate evaluation of advertising effect. This can meet advertisers' desires at a level at least higher than that achieved by the "reach preferred" type method for selecting advertising spots illustrated in JP-A 2002-24525.

Further, the present inventors expect that it is sufficiently possible to produce advertising opportunities with an effect comparable to that of "mass media" type advertising media, depending on the "time", "place", "scene", and "mood" when an advertisement reaches consumers. The present inventors have thus introduced the concept of a "ContactPoint" to proactively consider opportunities for prospective consumers to contact brands without being restricted by the conventional concept of advertising media.

That is, a "ContactPoint" is a concept including not only advertising media such as "mass media" but also every advertising opportunity to introduce brands corresponding to advertised targets to prospective consumers, such as information from shops or cellular phones.

The present invention is made to solve the above technical problems, and is specified by the following technical items:

(1) a method of ContactPoint navigation comprising carrying out navigation for a ContactPoint producing a high advertising effect by letting a computer which has at least an arithmetic operation function and an input/output function, and which can gather information from a general database of perspective consumers, execute at least the steps of setting phases corresponding to an article type to which a brand belongs; extracting a prospective consumer that matches an attribute of a target prospective consumer from the general database of prospective consumers; determining a phase to which an individual extracted prospective consumer belongs; setting a time slot suitable for contact with the extracted prospective consumer for each phase; selecting one or more ContactPoints for each phase which are suitable for transmitting information to the prospective consumer belonging to each phase and which can more often contact the prospective consumer; and outputting the ContactPoint selected for each phase;

(2) a method of ContactPoint navigation comprising carrying out navigation for a ContactPoint producing a high advertising effect by letting a computer which has a general database of prospective consumers, a database of article information, and at least an arithmetic operation function and an input/output function and which can gather information from these databases, execute the steps of:
inputting an article type to which a brand belongs;
inputting an attribute of a target prospective consumer;
using the article information database to determine a purchase process corresponding to the article type to set phases appropriate to the purchase process;
selecting as a target population a prospective consumer that matches an attribute of a prospective consumer, and gathering information on the prospective consumer including at least information on a level of brand involvement;
determining a phase to which an individual prospective consumer in the target population belongs, on the basis of the information on the level of brand involvement;
determining a time slot suitable for contacting the target population for each phase;
calculating a ContactPoint power for each phase on the basis of one, or a combination of, a ContactPoint potential index, a ContactPoint-wise contact rate index, and a ContactPoint/mood affinity index in each target population;
selecting at least one or more ContactPoints for each phase in order of magnitude of ContactPoint power; and
outputting the ContactPoints selected for each phase;

(3) a method of ContactPoint navigation comprising carrying out navigation for ContactPoints producing a high advertising effect by letting a computer which has a general database of prospective consumers, a database of article information, and at least an arithmetic operation function and an input/output function and which can gather information from these databases, execute the steps of:
inputting an article type to which a brand belongs;
inputting an attribute of a target prospective consumer;
using the database of article information to determine a purchase process corresponding to the article type to set phases appropriate to the purchase process;
selecting as a target population a prospective consumer that matches an attribute of a prospective consumer, and gathering information on the prospective consumer including at least information on a level of brand involvement;
determining a phase to which an individual prospective consumer in the target population belongs, on the basis of the information on the level of brand involvement;
determining a time slot ($t_1$, $t_2$) suitable for contacting the target population for each phase;

acquiring a ContactPoint potential (CP-Potential (p)) for each ContactPoint for each phase from the database of target populations;
acquiring a performer rate index (MCR(t)) for each ContactPoint for each time slot from the database of target populations;
acquiring a mood affinity index (MAI(t)) for each ContactPoint for each time slot from the database of target populations;
calculating ContactPoint power (CP-Power(p)) for each ContactPoint for each phase for the target population using Equation (I);
selecting at least one or more ContactPoints for each phase in order of magnitude of ContactPoint power (CP-Power(p)); and
outputting the ContactPoints selected for each phase;

$$CP-\text{Power}(P) = CP-\text{Potential}(P) \times \int_{t_1}^{t_2} [MCR(t) \times MAI(t)]\,dt \quad (I)$$

(4) the method of ContactPoint navigation of (2) or (3), further comprising the steps of:
inputting a communication budget;
allocating a communication budget to each phase according to the number of prospective consumers in each target population for each phase;
distributing the budget for a phase among the selected ContactPoints, according to the ContactPoint power values of the ContactPoints; and
outputting the budget for a selected ContactPoint;

(5) a method of ContactPoint navigation comprising carrying out navigation on ContactPoints producing a high advertising effect by letting a computer which has a general database of prospective consumers, a database of article information, and at least an arithmetic operation function and an input/output function and which can gather information from these databases, execute the steps of:
inputting an article type to which a brand belongs;
inputting an attribute of a target prospective consumer;
inputting a communication budget;
using the database of article information to determine a purchase process corresponding to the article type to set phases appropriate to the purchase process;
selecting as a target population a prospective consumer that matches an attribute of a prospective consumer, and gathering information on the prospective consumer including at least information on a level of brand involvement;
determining a phase to which an individual prospective consumer in the target population belongs, on the basis of the information on the level of brand involvement;
determining a time slot suitable for contacting the target population for each phase;
allocating a communication budget to each phase according to the total number of prospective consumers gathered as a target for each phase;
determining the number of ContactPoints for each phase according to the budget for each phase;
calculating a ContactPoint potential index, an average ContactPoint-wise contact rate index in the time slot, and an average ContactPoint/mood affinity index in the time slot, for the target population and for each ContactPoint;
ranking the ContactPoints for each index according to their index values;
selecting, for each index, a determined number of ContactPoints starting from the highest ranked ContactPoint;

finally selecting only the ContactPoints selected for all or a number of indices; and outputting the ContactPoints finally selected for each phase;

(6) a method of ContactPoint navigation comprising carrying out navigation on ContactPoints producing a high advertising effect by letting a computer which has a general database of prospective consumers, a database of article information, and at least an arithmetic operation function and an input/output function and which can gather information from these databases, execute the steps of:

inputting an article type to which a brand belongs;

inputting an attribute of a target prospective consumer;

inputting a communication budget;

using the database of article information to determine a purchase process corresponding to the article type to set phases appropriate to the purchase process;

selecting as a target population a prospective consumer that matches an attribute of a prospective consumer, and gathering information on the prospective consumer including at least information on a level of brand involvement;

determining a phase to which an individual prospective consumer in the target population belongs, on the basis of the information on the level of brand involvement;

determining a time slot suitable for contacting the target populations for each phase;

allocating a communication budget to each phase according to the ratio of prospective consumers in each phase to total prospective consumers in the target population;

determining a final selection number of ContactPoints for each phase according to the budget for each phase, and setting such a primary limiting quantity and a secondary limiting quantity as a lead to the final selection quantity;

calculating a ContactPoint potential index, an average ContactPoint-wise contact rate index in the time slot suitable for the target population, and an average ContactPoint/mood affinity index in the time slot suitable for the target population, for each ContactPoint;

using one of the indices to select the primary limiting quantity of ContactPoints starting from one with the highest index value;

using one of the indices, except the one used for the primary limitation, to select the secondary limiting quantity of ContactPoints from those remaining after the primary limitation, starting from one with the highest index value;

using one of the indices, except those used for the primary and secondary limitations, to select the selection number of ContactPoints from those remaining after the secondary limitation, starting from one with the highest index value;

outputting the ContactPoints selected for each phase;

(7) the method of ContactPoint navigation of any one of (4) to (6), comprising further execution of the steps of equally distributing a budget for a phase among the selected ContactPoints, and outputting the budget for each of the selected ContactPoints;

(8) the method of ContactPoint navigation of any one of (4) to (7), comprising further execution of a step of selecting one or more vehicles relating to the selected ContactPoints, in order of contact rate index (CR), within the budget for each ContactPoint;

(9) the method of ContactPoint navigation of any one of (4) to (7), comprising further execution of the steps of:

distributing the budget for each ContactPoint among the vehicles relating to the selected ContactPoints, which have a contact rate index (CR) equal to or larger than a threshold, according to the ratio of each contact rate index, to the total value of the contact rate indices of the vehicles; and outputting the budget for each vehicle;

(10) the method of ContactPoint navigation of any one of (2) to (9), wherein the mood affinity index MAI(t) is obtained by deriving a weighted average value of affinity indices using Equation (II), on the basis of a share (share (t, m)) of each mood type for the target population and a media/mood affinity index (affinity(m));

$$MAI(t) = \sum_{m=m_1}^{m_{10}} [\text{share}(t, m) \times \text{affinity}(m)] \quad \text{(II)}$$

(M: Mood (Mode) Type; Ten Types)

(11) the method of ContactPoint navigation of any one of (2) to (10), wherein the ContactPoint potential (CP-Potential (p)) is determined by gathering and compiling information on the contribution of each media serving as a means for article information recognition in each phase, from the database of target populations;

(12) the method of ContactPoint navigation of any one of (2) to (11), wherein the step of determining a time slot suitable for contacting the target population for each phase determines, for each phase, a time slot in which a proportion of prospective consumers belonging to a target population who can receive the information appropriate to the phase is equal to or more than a predetermined threshold, to be a time slot suitable for contacting the target population;

(13) the method of ContactPoint navigation of any one of (2) to (11), wherein the step of determining a time slot suitable for contacting the target population for each phase comprises at least the steps of:

displaying, for each phase, a time slot in which the proportion of prospective consumers belonging to a target population who can receive information appropriate to the phase is equal to or more than a predetermined threshold; and arbitrarily selecting and inputting one or more of the displayed time slots for each phase;

(14) the method of ContactPoint navigation of any one of (2) to (13), wherein the communication budget is a share of a total communication budget for an entire campaign period, for each of a number of planned periods into which the entire campaign period is divided, and wherein the communication budget is determined to be distributed among the phases such that as the planned period is closer to the beginning of the campaign period, a larger share of the budget is allocated to an early phase of a purchase process, while a smaller share of the budget is allocated to a later phase of the purchase process, or such that as the planned period is closer to the end of the campaign period, a smaller share of the budget is allocated to an early phase of a purchase process, while a larger share of the budget is allocated to a later phase;

(15) the method of ContactPoint navigation of any one of (2) to (13), wherein the communication budget is a share of a total communication budget for an entire campaign period, for each of a number of planned periods into which an entire campaign period is divided, and wherein each of the communication budgets is obtained by distributing the total communication budget according to the ratio of the number of prospective consumers that match an attribute of a prospective consumer for each phase during each planned period, to the total number of prospective consumers that match an attribute of a prospective consumer for all the planned periods and for all the phases, and then adding these budgets for each phase of the purchase process;

(16) the method of ContactPoint navigation of any one of (2) to (13), wherein the communication budget is a share of a total communication budget for an entire campaign period, for each of a number of planned periods into which an entire campaign period is divided, and wherein each of the communication budgets is obtained by estimating the number of prospective consumers during a corresponding planned period on the basis of year-round transition statistics for the number of prospective consumers that match an attribute of a prospective consumer, and then distributing the total communication budget according to the ratio of the estimated number of prospective consumers to the estimated total number of prospective consumers during the entire planned period;

(17) a recording medium in which the method of Contact-Point navigation of any one of (1) to (16) is recorded in a format able to be read by computer; and

(18) a transmission medium which transmits the method of ContactPoint navigation of any one of (1) to (16) in a manner able to be executed by computer.

Further, present inventions (19) to (33) relate to ContactPoint navigation systems that correspond to the methods of ContactPoint navigation of present inventions (2) to (16), respectively.

Herein, the term "prospective consumer" is synonymous with general consumers, but in fact represents ordinary people in general, regardless of whether or not they consume articles or services.

The term "brand" refers to the name of an article or service whose consumption is desired, and is a unit enabling articles or services to be distinguished from one another in terms of their supplier, performance, or the like.

The term "media" collectively refers to something that transmits information when introducing information regarding an article or service to prospective consumers. In the present invention, the "media" is not limited to so-called "mass media", which includes TV, radio, and newspapers.

The term "vehicle" collectively refers to each of the media brands within the same type of media, if the media brands must be distinguished from one another (for example, station A/channel a and station B/channel b for TV, and newspaper C/newspaper D for newspapers).

The term "communication" collectively refers to an act of introducing a company brand to prospective consumers, such as an advertisement, promotion, or information provision.

The term "ContactPoint" collectively refers to opportunities to introduce a brand to prospective consumers. The "ContactPoint" is not limited to "mass media" but also includes cases in which consumers are merely exposed to the brand, without any direct advertising or promotional activities.

The term "purchase process" refers to a modeled stream of consciousness of a consumer when consuming an article or service, from recognizing the brand of an article or service, until a decision to purchase the same. For some articles or services, the process by which a consumer becomes a repeater is modeled. The "purchase process" can be roughly classified into a "brand recognition phase", a "brand preference phase", a "decision phase", and a "retention phase".

The term "phase" refers to each of the stages when dividing the above-mentioned purchase process into levels of increasing awareness. In the case of a common article or service, the phases include a routine stage of recognizing an article type or brand, a stage of subjectively checking each article type to consider whether or not it needs to be purchased and the relative merits between brands, a stage of determining whether or not to actually purchase any article type, and a stage of retaining a memory of the brand or the like to motivate the consumer to be a repeater and repurchase any article type after purchasing it.

The term "level of brand involvement" refers to a numerical measure for the relationship between an individual prospective consumer and a brand, which is examined using a measuring technique typified by using an SD method (semantic differential method) on prospective consumers. In some cases, the level of brand involvement may be replaced with an index such as the frequency of brand use, purchase, or consumption. The level of brand involvement index varies over time, reflecting the elevation of consciousness that occurs as an advertising campaign progresses.

The term "article type" is closely related to the "purchase process" and is normally roughly classified into a "durable consumer goods type" and a "daily necessities type". The "article type" corresponds to a type of article or service for which the consumer population ratio for each phase exhibits common tendencies in connection with the standard purchase frequency of the article type.

The term "navigation" refers to the provision of support information for advertising or promotional activities, including the selection of ContactPoints suitable for effectively transmitting brand information to prospective consumers, the determination of vehicles, and the allocation of a communication budget.

The term "general database of prospective consumers" refers to a database storing data on a sufficient number of prospective consumers that are randomly extracted and selected in order to judge social conditions, in which data indicating what media is used by the prospective consumers to contact various information, and what amount of information is contacted by these prospective consumers, data indicating the moods of the prospective consumers at each particular time, and data indicating what article types the prospective consumers tend to consume, and the level of consumption of each of these article types can be retrieved on the basis of attribute information on these prospective consumers.

The term "database of article information" refers to searchable databases that store information on the correlations between article type and purchase process, and on the correlations between purchase process and phase setting. The databases enable the identification of standard purchase processes that correspond to each article type and the phases of the purchase processes.

The term "ContactPoint potential index" represents the effects of each media as an information source for each phase. The ContactPoint potential index is obtained by totaling, through web surveys or door-to-door surveys, information on which media is utilized by individual prospective consumers, corresponding to each phase of a purchase process.

The term "ContactPoint-wise contact rate index" refers to the percentage of prospective consumers contacting (or acting on) each ContactPoint at each particular time. The ContactPoint-wise contact rate index is a collective term for TV audience ratings, radio listener ratings, magazine reader ratings, and the like.

The term "ContactPoint/mood affinity index" represents the results of surveys of the compatibility between each ContactPoint and mood type (ten types). The sum of the index for all mood types is 100% for each ContactPoint.

DESCRIPTION OF SYMBOLS

| CPU | Host computer |
| --- | --- |
| DB1 | General database of prospective consumers |
| DB2 | Database of article information |
| T.P.-DB | Database of target populations |
| BL | Bus line |
| Terminal | Operation terminal |
| SU1 to SUn | Sample users |

BEST MODE FOR CARRYING OUT THE INVENTION

Figure 1:
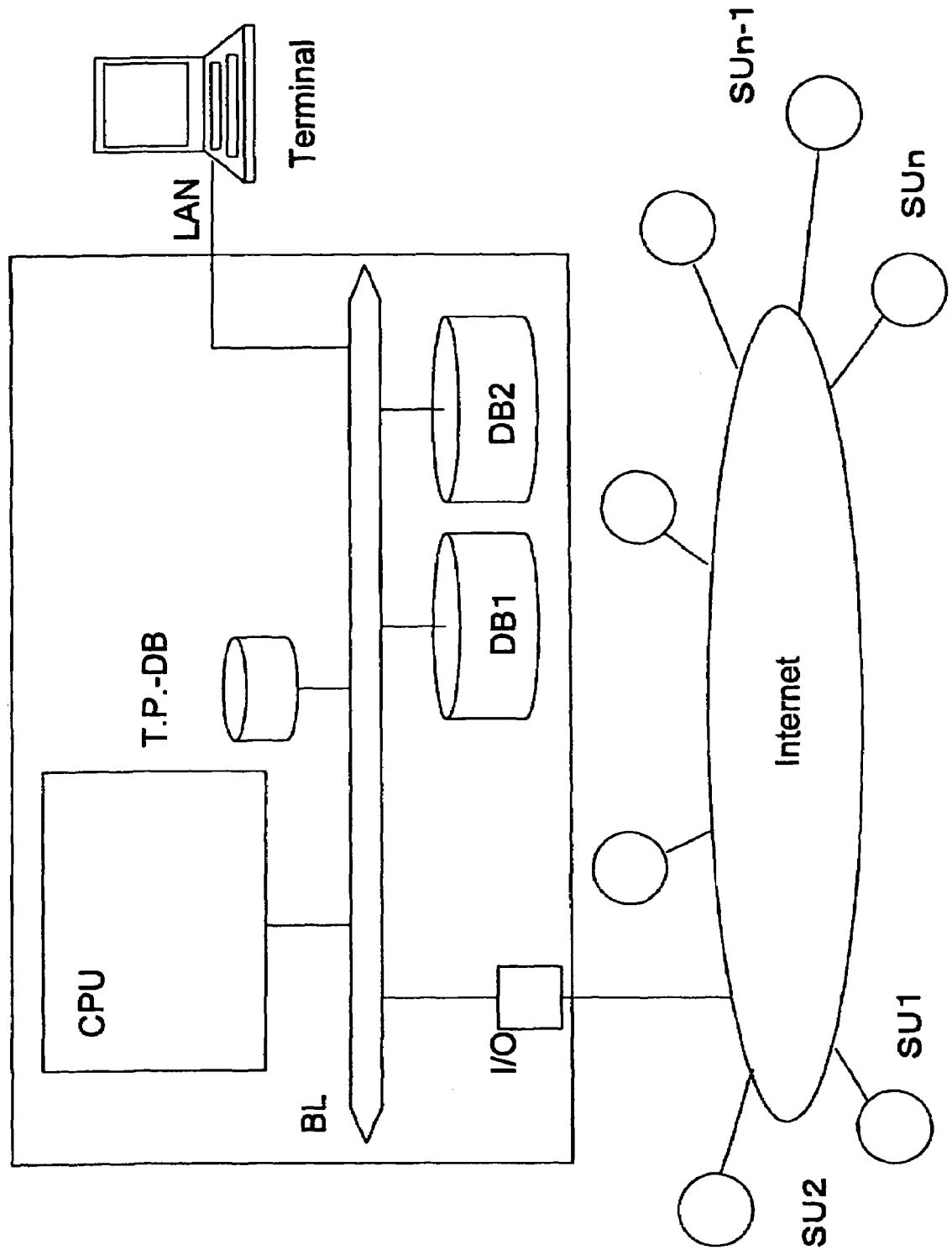
FIG. 1 is a schematic diagram of a system configuration in accordance with the present invention.

FIG. 1 shows the basic system configuration of a ContactPoint navigation system in accordance with the present invention. The ContactPoint navigation system has a very simple hardware configuration. A host computer (CPU) is connected to a general database of prospective consumers (DB1) and a database of article information (DB2) via a bus line (BL). The host computer (CPU) is also connected to a terminal (Terminal) comprising an input/output function. The input/output terminal can be connected to other terminals installed in the same premise or outside the building, via a LAN or the like.

Further, the host computer (CPU) is desirably connected to a network such as the Internet, and configured to conduct web surveys of sample users (SU) and then update in real time the information stored in the general database of prospective consumers (DB1) and the database of article information (DB2).

Moreover, since the databases of general prospective consumers (DB1) and the databases of article information (DB2) are frequently used to extensively gather diversified information and for other purposes, the systems are desirably configured to make new databases (T.P.-DB) only for target populations by gathering only the data required for ContactPoint navigation, separately from the above databases.

The following is a description of a process for using a ContactPoint navigation system of the present invention to determine a ContactPoint that produces a high advertising effect and a budget allocation for the ContactPoint.

(Step 1)

Figure 2:
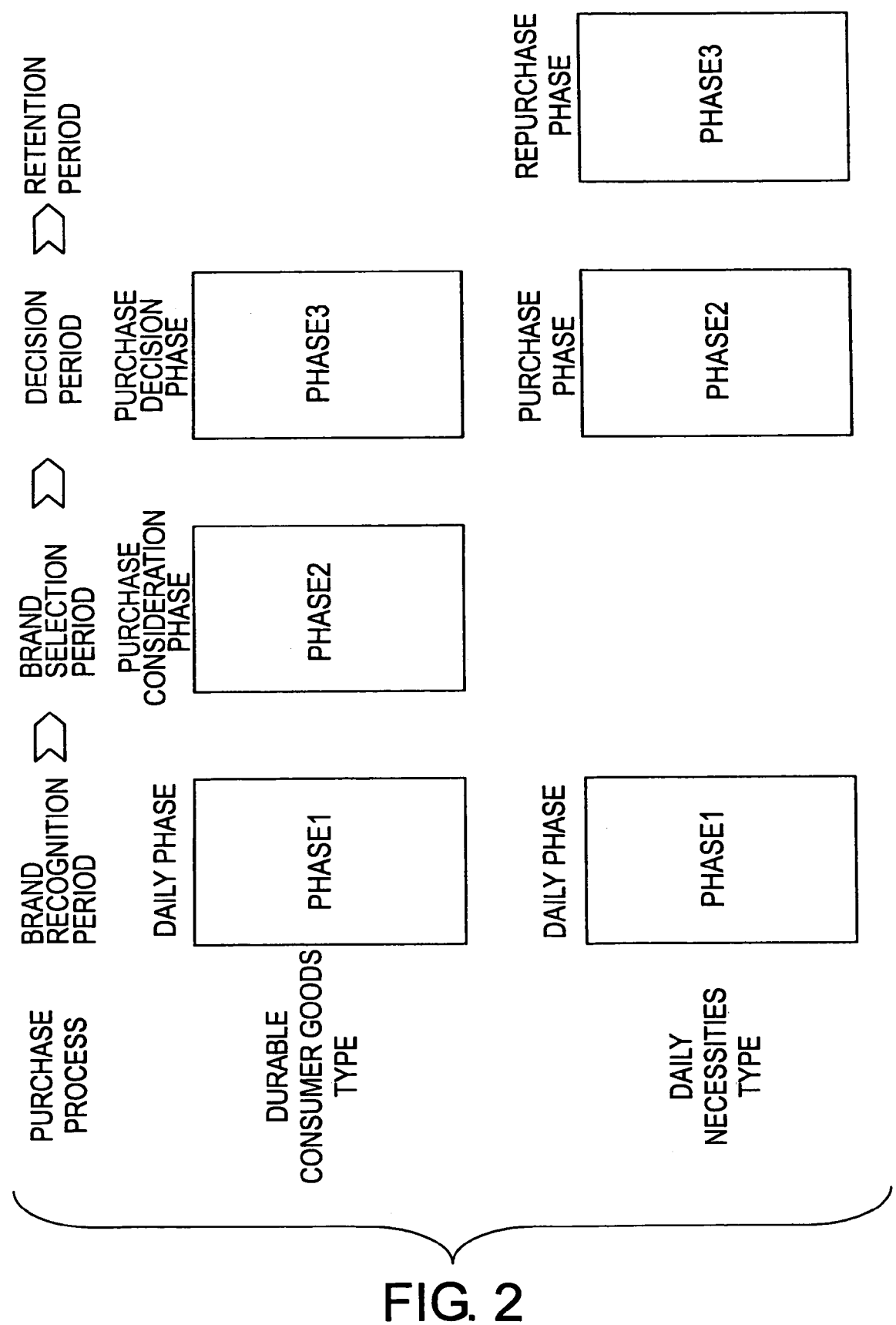
FIG. 2 is a diagram illustrating a purchase process for each article type.

First, a purchase process is determined based on the article type of a brand to be advertised. This is schematically shown in FIG. 2. The purchase process normally includes four phases: a "brand recognition phase", a "brand selection phase", a "decision phase", and a "retention phase". Specifically, a general consumer first recognizes advertised brands. Then, the general consumer gradually develops a preference from among the competing brands, and decided to purchase the selected brand. The general consumer remembers the brand for a certain period after the latest purchase date, and then returns to their original state.

However, the four phases are not always definite for many actual articles or services. Further, in most cases, taking the four phases into account is not effective for advertising effect. Thus, the present invention adopts methods that roughly classify the purchase process into a "durable consumer goods" type and a "daily necessities" type instead of systematizing a single purchase process, and appropriately selects either of the purchase processes to suit a brand to be advertised.

A typical example of the former type is automobiles, and of the latter type is hamburgers. Thus, for the "durable consumer goods" type article or service, taking into account the fourth "retention" phase is unpractical because the brand itself is usually changed before repurchase.

On the other hand, for the latter "daily necessities type" articles or services, consumers rarely weigh one brand against another before purchasing, and in fact haphazardly purchase articles or services without being involved in the brand selection phase. Accordingly, in ContactPoint navigation, it is practical to consider the retention phase in light of the presence of repeaters, rather than to take the brand selection phase into consideration.

Normally, before planning an advertising campaign plan, prospective consumers are surveyed as to their level of involvement with an article type and this is stored as quantified index data. Accordingly, by simply inputting the article type to which the brand belongs, and gathering information on the involvement level with the article type, it is possible to easily determine which purchase process is followed. The format of the above-described inputting of article type is not limited. The system may be configured so that the purchase process (and its phase division) can be manually input. Further, in cases where indexed information on involvement level, obtained using the SD method, is not stored in advance, the involvement level can be replaced with data such as purchase frequency, utilization frequency, and consumption frequency for an article type.

For example, durable consumer goods such as automobiles are not frequently purchased and are expensive. Accordingly, careful consideration is required before deciding to purchase such goods. In this case, the purchase process is divided into three phases, a "daily phase", a "purchase consideration phase", and a "purchase decision phase", as shown in FIG. 2.

For the "daily phase" it is important to make consumers recognize and take interest in brands corresponding to advertising targets. On the other hand, in the "purchase consideration phase", individual consumers gather information on various brands prior to purchase, and narrow down favorite brands. Thus, just loosely providing information on brands has little meaning, and detailed information on the brand is required to limit the range of purchase candidates. An advertisement that can impress consumers with the excellence of the brand, and appropriate selection of media through which such an advertisement is distributed are required. Moreover, while opportunities to directly see and touch the article, such as an exhibition or a test-ride event, become more important in the "purchase decision phase", information sources such as specialized magazines containing expert views and discount information also become more important. Thus, advertisements are preferably concentrated in such advertising media.

For durable consumer goods such as automobiles, it is generally rare that the same individual repurchases the same car before a model change. Accordingly, in terms of the brand advertisement or promotion, there is little necessity to consider repeaters. In this case, the purchase process is thus divided into the three phases.

On the other hand, in the purchase process assumed for "daily necessities type" articles or services, such as hamburgers, the "daily phase", "purchase consideration phase", and "purchase decision phase" for the "durable consumer goods type" become mixed. It is thus practical to divide the purchase process into a "daily phase" for brand recognition and a "purchase phase" immediately prior to purchase for directly motivating consumers to visit a shop. Moreover, it is a good assumption that the same consumer will revisit a shop as a repeater, and repurchase the article during the campaign period. Therefore, in the early period after the latest purchase date, it is important to consider a "repurchase phase", during which a memory of the brand is retained, and there is no need to generate brand awareness.

As described above, by determining whether the article type of a brand to be advertised belongs to the "durable consumer goods type" or the "daily necessities type", a phase division is automatically selected and at the same time, a work area is also reserved for subsequent processing.

(Step 2)

Next, a group of prospective consumers to whom an advertiser aims to advertise the brand is selected from the general database of prospective consumers. A specific selection criterion for a target may be, for example, unmarried women in their twenties, or men in their thirties with a family. Any information gathering item in the above-mentioned general database of prospective consumers can be adopted as a selection criterion.

A selection criterion is inputted to extract target prospective consumers that meet the selection criterion from the general database of prospective consumers. At the same time, information on target prospective consumers is gathered and separately stored as a database of target populations. In some cases, the attributes of purchasers of the article type may be analytically extracted from the above-mentioned general database of prospective consumers, and prospective consumers matching the attributes of that patron base can be automatically extracted as targets.

(Step 3)

Next, a "time slot" ($t_1$ to $t_2$) for advertising, which is suited to the article type, is determined for each of the above phases. This time slot is a time slot for which information appropriate to the phase can be provided. Accordingly, in the "daily phase", for example, prospective consumers in this phase do not attempt to proactively acquire information on articles. It is thus impossible to transmit detailed information on brands to prospective consumers. However, if it is a time slot in which prospective consumers are awake, brand recognition is possible. Thus, the appropriate "time slot" during the "daily phase" is the typical time during which the target prospective consumers are awake (for example, 6:00 a.m. to midnight).

On the other hand, for example, in the "purchase consideration phase" and "purchase decision phase" or the "purchase phase", more detailed information is transmitted. It is thus necessary to select the time slot in which the target prospective consumers are not only awake, but also ready to receive the detailed information provided during the phase. For example, for the sale of automobiles, prospective consumers in the "purchase consideration phase" are assumed to leisurely compare one catalog with another. Accordingly, the appropriate "time slot" for advertisement is the time during which the prospective consumers are at home, for example, in the evening on weekdays, or on Saturday and Sunday. In the "purchase decision phase", the "time slot" during which stores are open is appropriate for advertisement because it is important that the prospective consumers can receive information from dealers or the like, such as discount information for each shop.

Since selection of the "time slot" normally depends on the advertiser's intention in concurrence with selection of the "target", the present systems only output time slot candidates for each phase, and allow a user to manually select one time slot as a kind of initial value. The "time slot" candidates are selected such that information at a level appropriate to the phase can be provided by statistically deriving the standard lifestyle of a group of prospective consumers that match the attributes of target prospective consumers. The systems can also be configured to determine the "time slots" completely automatically.

In these cases, when determining the standard lifestyle, it is possible to subdivide the group of prospective consumers for each phase to determine a standard lifestyle for each phase rather than deriving the single lifestyle of the group of prospective consumers matching the attributes of the target prospective consumers.

(Step 4)

Subsequently, various indices used as criteria for selecting a ContactPoint are calculated for each ContactPoint and for each phase. The present systems calculate ContactPoint power using a combination of a (i) ContactPoint potential index, a (ii) ContactPoint-wise contact rate index, and a (iii) ContactPoint/mood affinity index.

Figure 3:
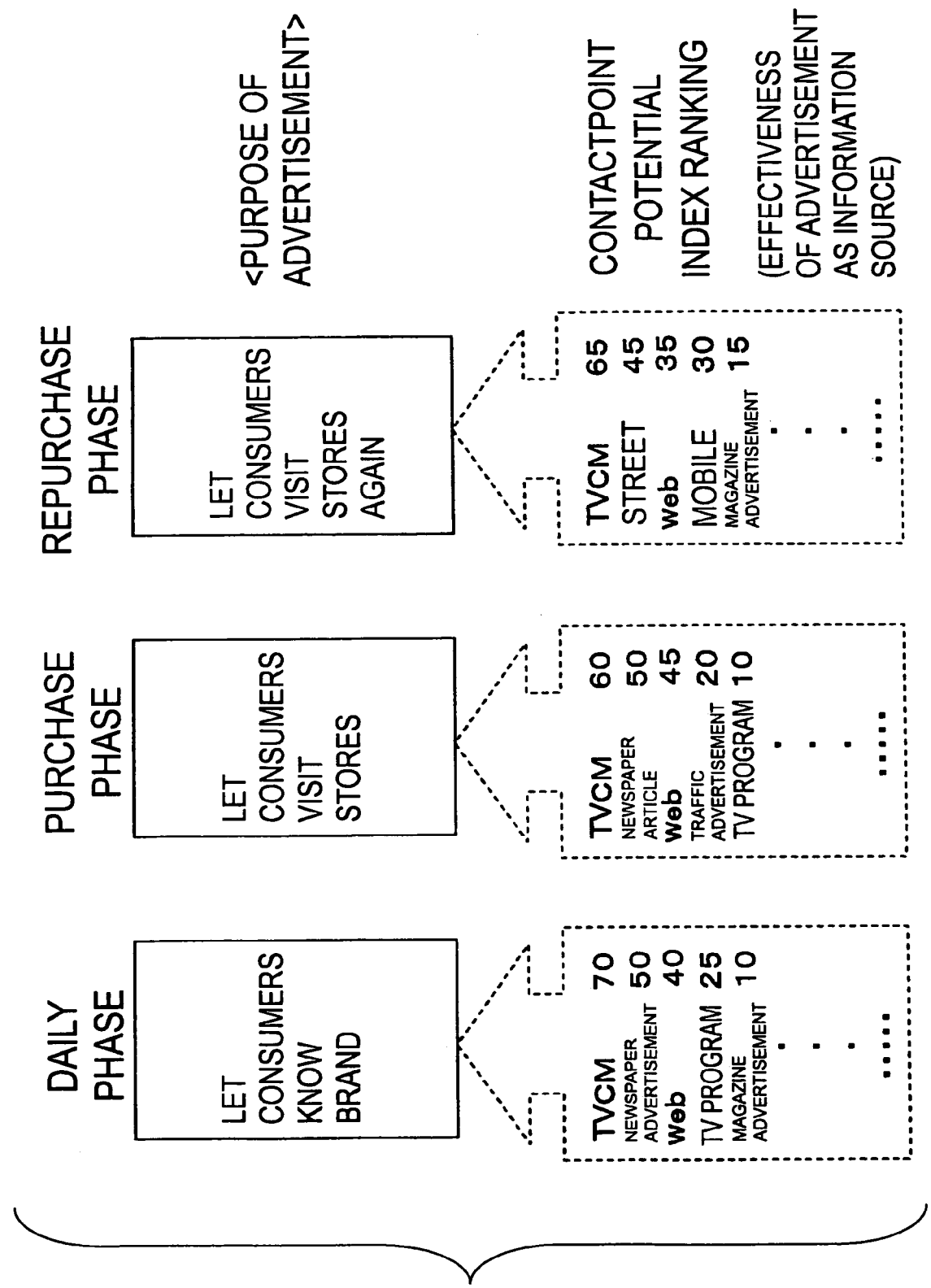
FIG. 3 is a diagram showing an example of ranked contact potentials in accordance with the present invention.

First, the ContactPoint potential is an index indicating the power of information sources for each phase. This index is obtained by using web surveys or door-to-door surveys to evaluate the influence of every ContactPoint on brand recognition, that is, to evaluate the effectiveness of every ContactPoint as an information source, for each phase. By way of example, FIG. 3 shows ranked ContactPoint potential values for each phase for a "daily necessities type" brand.

Next, the "ContactPoint-wise contact rate index (MCR(t))" is an index of an audience rating, listener rating, reader rate, doer's ratio, or the like, totaled for each time slot. In other words, it is the percentage of people who are able to use each ContactPoint. The upper part of FIG. 4 illustrates the contact rate values for TVCM and the web.

Figure 4:
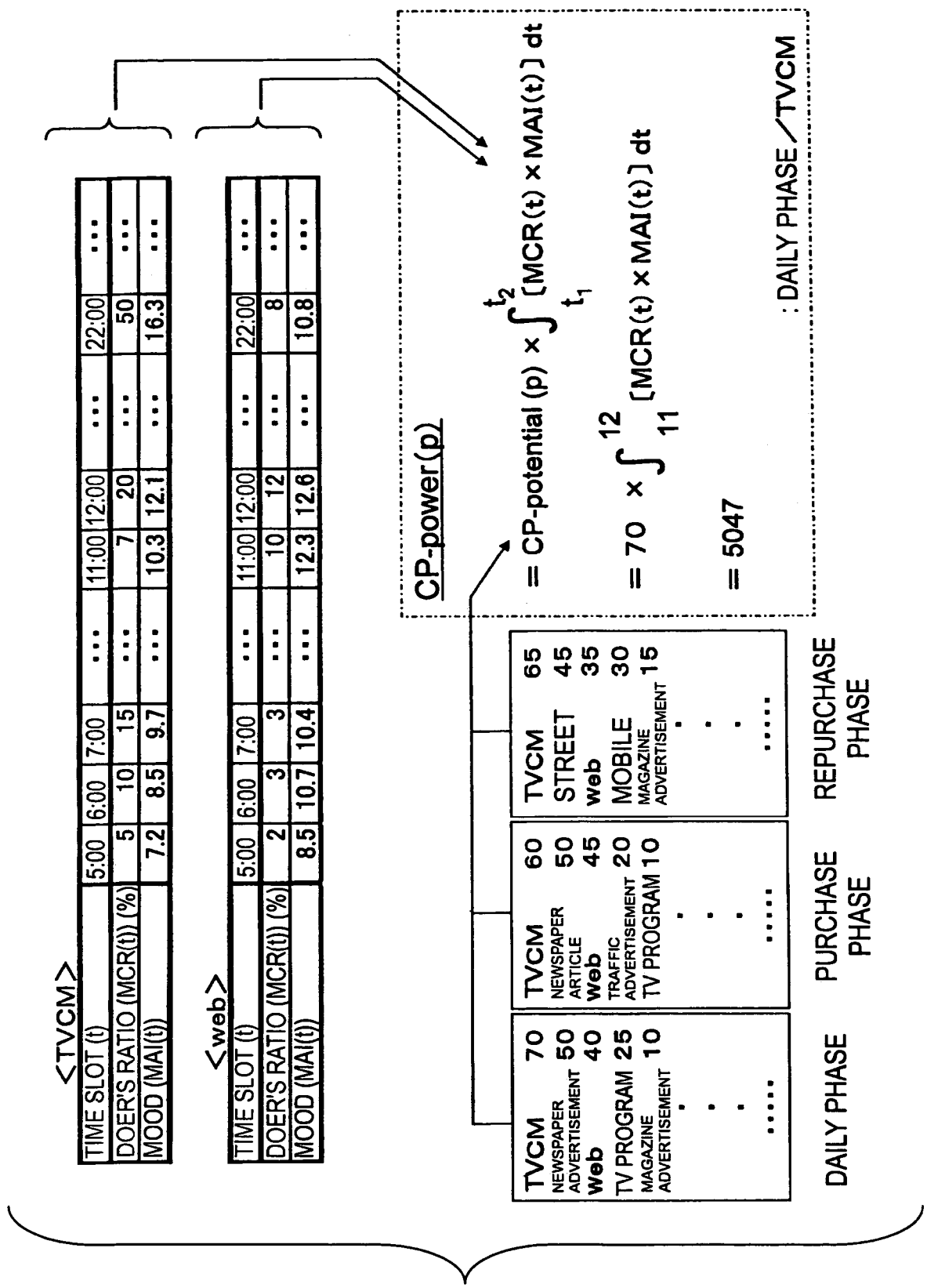
FIG. 4 is a diagram showing an example of a calculation of ContactPoint power in accordance with the present invention.
Figure 5:
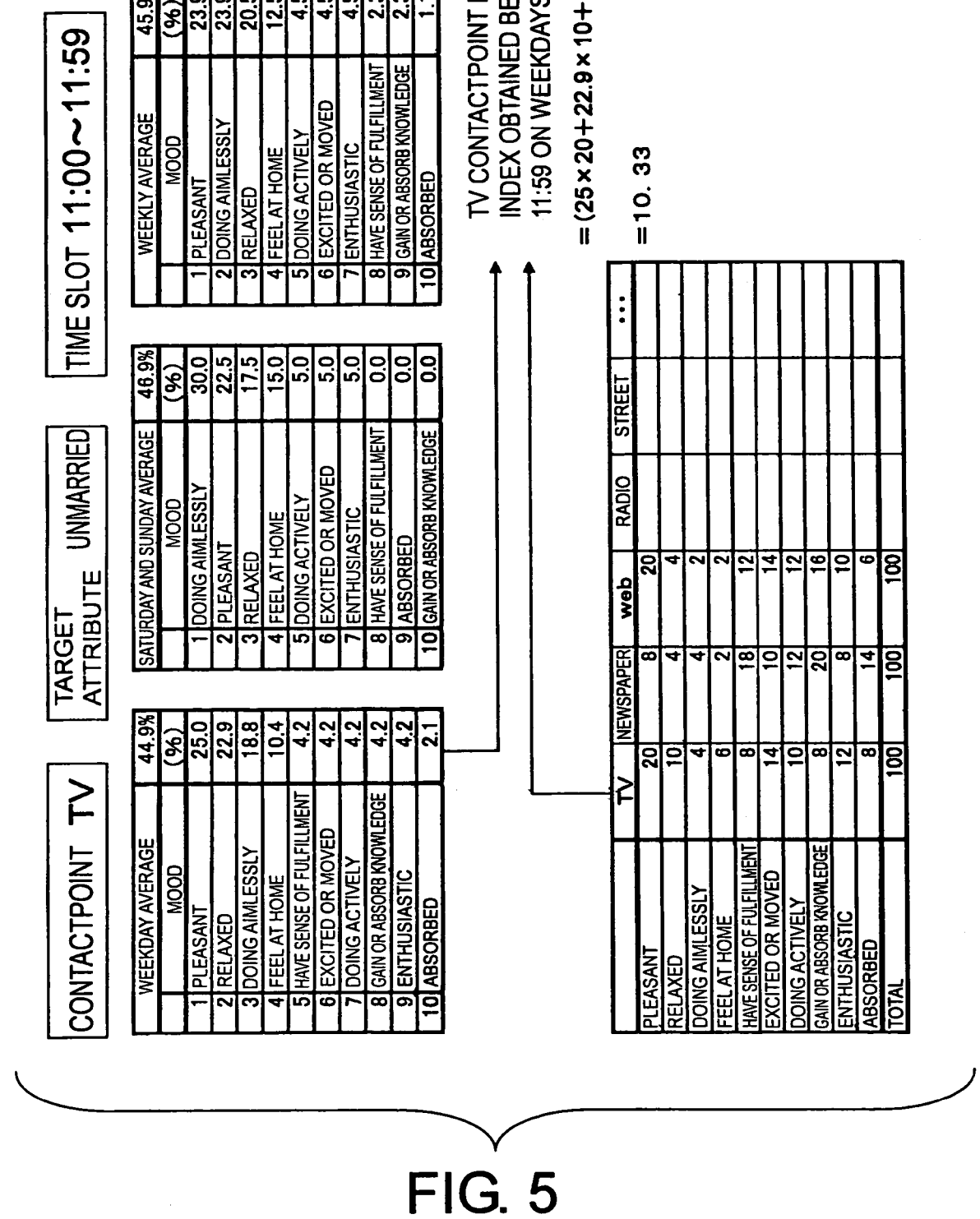
FIG. 5 is a diagram showing an example of a calculation of a ContactPoint/mood affinity index in accordance with the present invention.

The "ContactPoint/mood affinity index (MAI(t))" is also shown in the upper part of FIG. 4 (shown as "Mood (MAI(t))" in the figure). This value is calculated as shown in Equation (II). First, mood scores for a group of prospective consumers, who are targeted by a ContactPoint, are gathered for each time slot (the upper part of FIG. 5). Scores for the affinity between the ContactPoint and the mood are also gathered (the lower part of FIG. 5).

$$MAI(t) = \sum_{m=m_1}^{m_{10}} [\text{share}(t, m) \times \text{affinity}(m)] \quad \text{(II)}$$

(m: mood (mode) type, ten types)

Here, the moods (modes) of prospective consumers are generally classified into ten types. For example, while watching TV, an average of 20% of prospective consumers feel "pleasant", and 10% feel "relaxed". Thus, the mood when contacting a ContactPoint also differs between individuals, and thus mood scores must also be gathered in advance.

Furthermore, "mood", varies with the time slot. For example, in the time slot of 11:00 to 11:59 on weekdays, 25.0% of prospective consumers feel "pleasant", and 22.9% are in the mood for "doing aimlessly".

The weighted average of both scores (0.25×20+0.229×10+ 0.188×4+ . . . ) is the "ContactPoint/mood affinity index (MAI(t)) (the upper part of FIG. 4). The product of the affinity index (MAI(t)) and the ContactPoint-wise contact rate index (MCR(t)) is integrated over the time slot ($t_1$ to $t_2$). The result is then multiplied by the above ContactPoint potential (CP-potential) to calculate the ContactPoint power (CP-Power) for each phase. A specific formula is shown below as Equation (I).

$$CP-\text{Power}(P) = CP-\text{Potential}(P) \times \int_{t_1}^{t_2} [MCR(t) \times MAI(t)] dt \quad \text{(I)}$$

Figure 6:
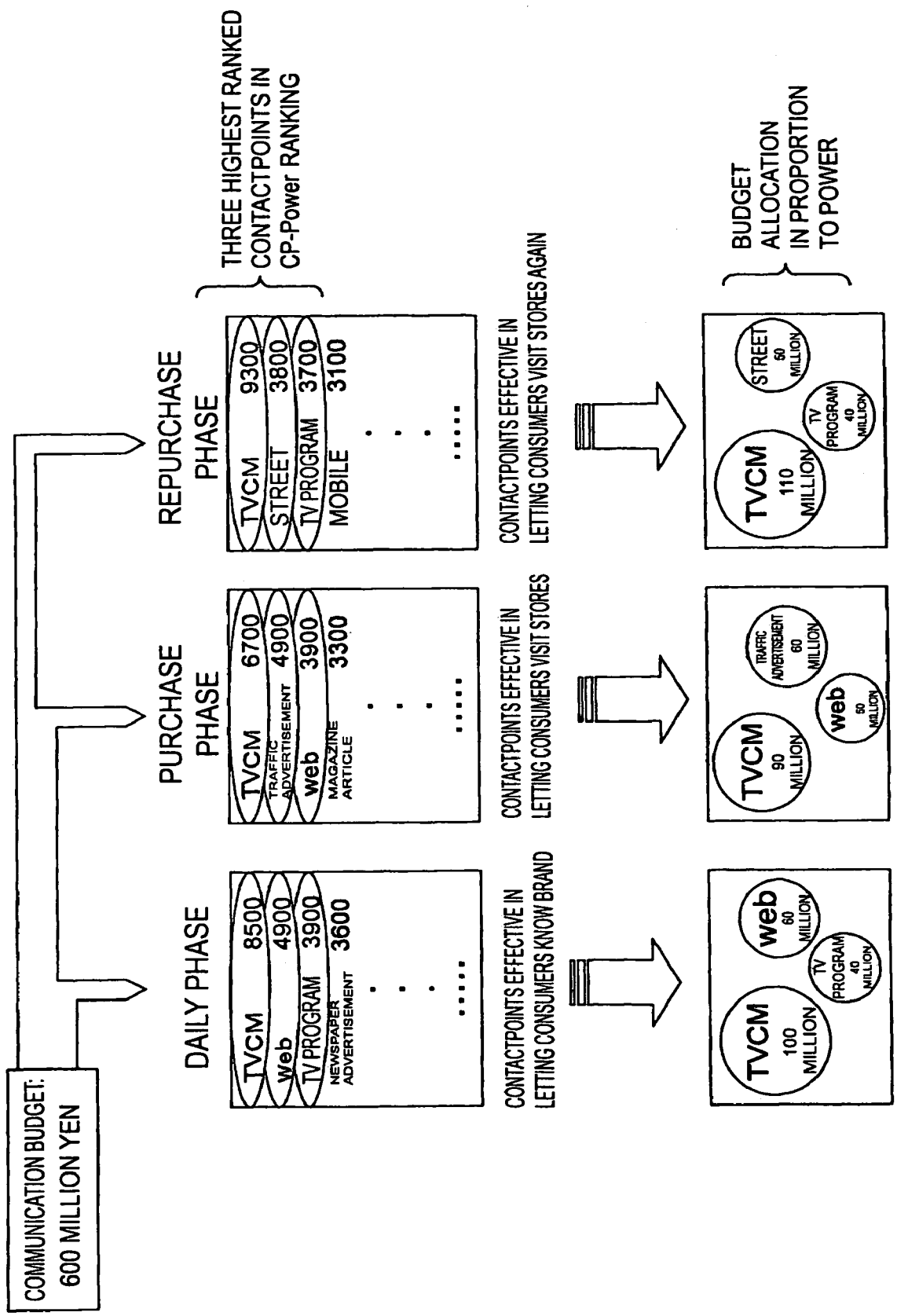
FIG. 6 is a diagram showing an example of selection of ContactPoints and distribution of a budget among the contact points in accordance with the present invention.

Herein, to consider factors such as mood as truly as possible, Equation (I) has been used to calculate the ContactPoint power; however, there is no restriction to this equation. One or more of the above indices can also be used to calculate the ContactPoint power for each phase. FIG. 6 shows the thus obtained ContactPoints ranked according to the magnitudes of their power.

(Step 5)

Based on the obtained ContactPoint power rankings, effective ContactPoints are then selected. FIG. 6 shows a case in which the total communication budget is 600 million yen and is equally distributed among the phases. Considering the acquisition cost unit price of advertisement spots, if about 200 million yen is allocated to each phase, about three ContactPoints are selected. In this example, ContactPoints are selected in order of rank: "TVCM", "web", and "TV program" are selected for the "daily phase", "TVCM", "traffic advertisement", and "web" are selected for the "purchase phase", and "TVCM", "web", and "TV program" are selected for the "repurchase phase".

Herein, there are various techniques that can be used to select ContactPoints. In view of the acquisition cost unit prices of advertisement spots, it is practical and simple to select ContactPoints in order of rank, depending on the budget allocated to each phase. For example, three ContactPoints are selected if the budget is within 200 million yen, six ContactPoints are selected if the budget is within 500 million yen, and nine ContactsPoints are selected if the budget is within one billion yen. It is also effective to select ContactPoints by sequentially subtracting the acquisition cost unit prices from the budget, starting from the highest ContactPoint in the power ranking, such that the selected ContactPoints stay within the budget allocated to each phase.

Figure 7:
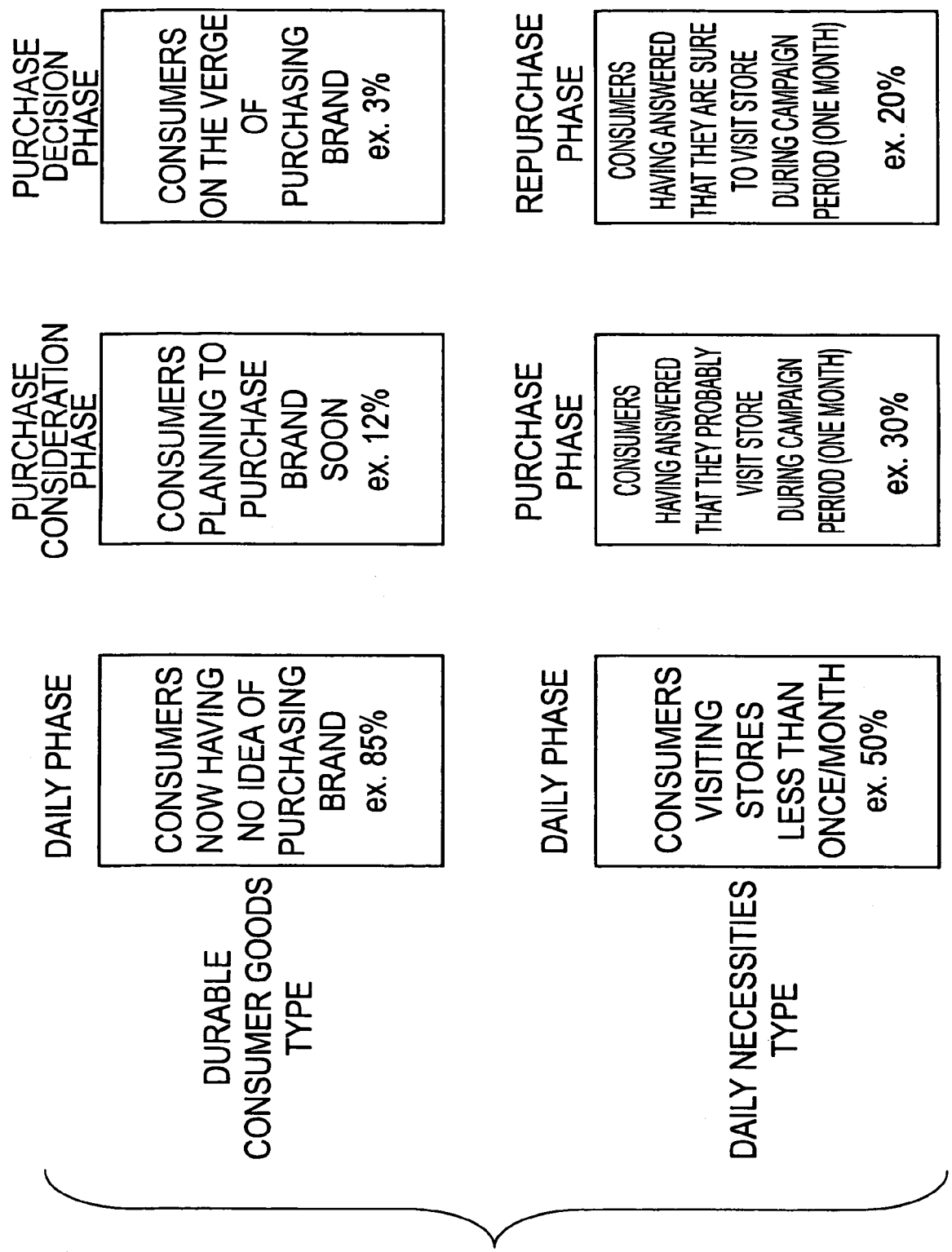
FIG. 7 is a diagram illustrating the percentage of prospective consumers in each phase for each purchase process in accordance with the present invention.

On the other hand, budget allocations for each phase are not limited to equal distributions. For example, as shown in FIG. 7, the percentage of prospective consumers corresponding to a phase is relatively easy to compile. Specifically, for the "durable consumer goods type", the phase to which prospective consumers belong can be determined by conducting web or door-to-door surveys to investigate a prospective consumer's plan to purchase an article type to which the brand belongs. On the other hand, for the "daily necessities type", preliminary surveys on, for example, "shop visit frequency" or "shop visit possibility during a campaign period" make it possible to calculate the percentage of prospective consumers in each phase by making definitions as shown in FIG. 7.

Therefore, it is effective to distribute a communication budget on the basis of the percentage of prospective consumers belonging to each phase (that is, the population ratio), since variations in the percentage of prospective consumers that are associated with progress of the campaign become negligible when the planned campaign period is relatively short. Alternatively, a threshold for ContactPoint power may be set for each phase, and ContactPoints exceeding the threshold may also be selected.

In this manner, ContactPoints are selected for each phase, as shown in FIG. 6. Then, in each phase, the budget allocated to each phase is distributed among the ContactPoints in proportion to the power index.

(Step 6)

The communication budget is then distributed among the selected ContactPoints. Specifically, it is practical to distribute the share (200 million yen) of the communication budget allocated to each phase of the planned period, in proportion to the ContactPoint power values. For example, in the "daily phase", 100 million yen is allocated to the "TVCM" (=200 million yen×8500(8500+4900+3900)), 60 million yen is allocated to the "web" (=200 million yen×4900(8500+4900+ 3900)), and 40 million yen is allocated to the "TV program" (=200 million yen×3900(8500+4900+3900)).

(Step 7)

Moreover, for each of the thus selected ContactPoints, a specific media brand, that is, a vehicle, is selected. For example, when "traffic advertisement" is selected as a media type and a budget of 80 million yen is allocated to that media type, the contact rate ranking for "traffic advertisements" is as follows: "1 Yamanote Line (acquisition unit price: 11 million yen), 2 Teito Rapid Transit Authority (TRTA) Marunouchi Line (acquisition unit price: 4 million yen), 3 TRTA Ginza Line (acquisition unit price: 4 million yen), . . . 9 Seibu Shinjuku Line (acquisition unit price: 4 million yen), . . . ". Thus, when selecting in order from vehicles with the highest contact rate, nine routes down to the ninth placed Seibu Shinjuku Line can be selected as vehicles within the limits of the 80 million yen budget.

In this case, vehicles are selected simply in order of contact rate ranking within the limits of the budget allocated to the ContactPoint. However, vehicles can also be selected to maximize the sum set of contact rates (including advertising concentrated on the same vehicle) or selected according to the ranking of the contact rate per unit acquisition cost, taking cost effectiveness into account.

(Budget Allocation for the Entire Campaign Period)

Figure 8:
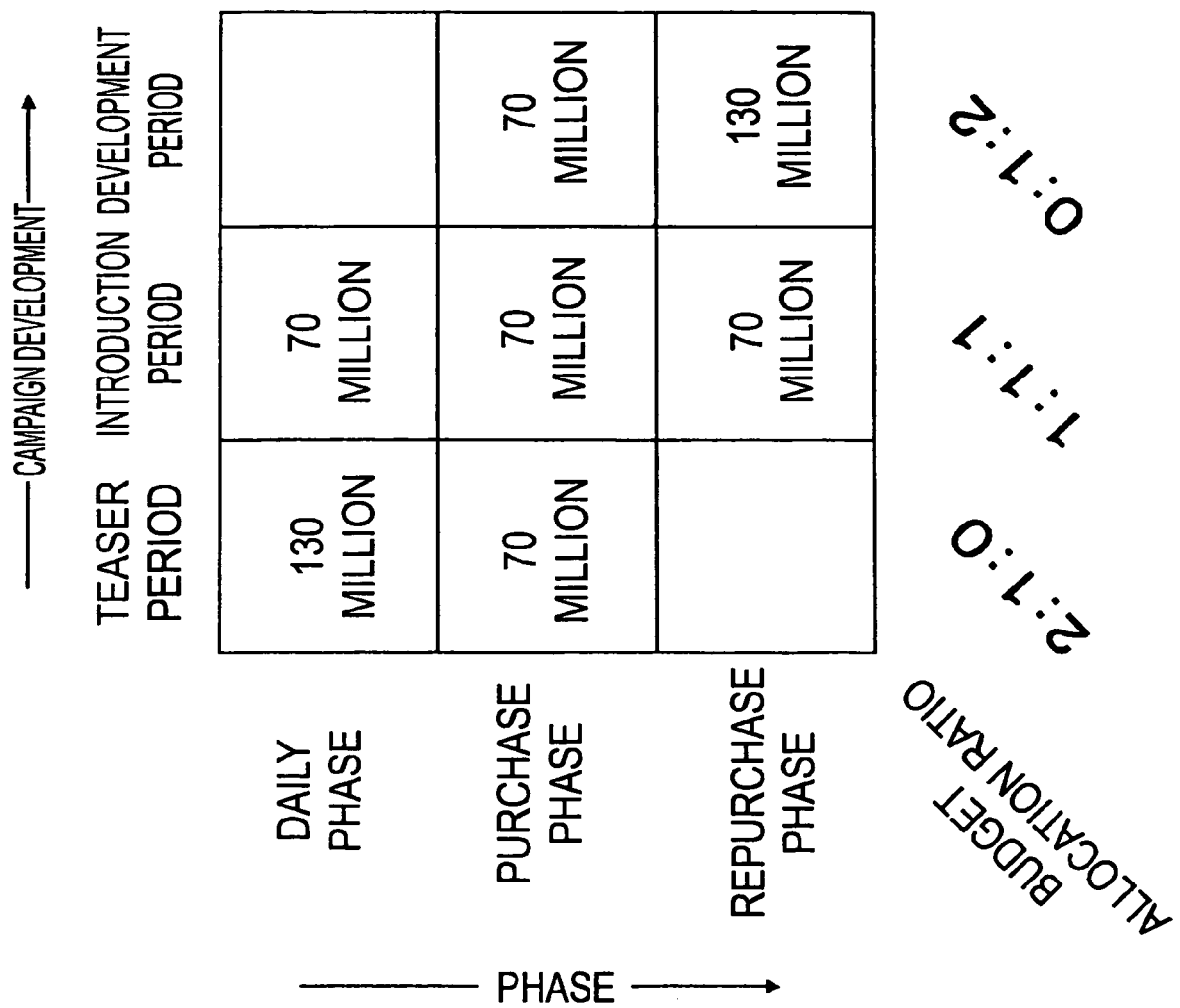
FIG. 8 is a diagram showing an example of the distribution of a budget between campaign periods in accordance with the present invention.

The present systems can be configured to divide campaign periods into a number of periods, so that the ratio of allocations to phases can be varied depending on the periods. In such cases, as illustrated in FIG. 8, an entire campaign period is divided into three periods: a "teaser period", an "introduction period", and a "development period". These periods are different from the phases in that they are set along an absolute time axis. For example, a three-month campaign is divided into one-month periods.

For example, when 200 million yen is equally allocated to each phase, as illustrated in steps 5 to 7 described above, the budget can be allocated with sufficient accuracy in the "introduction period", the intermediate period of the campaign, since the ratio of prospective consumers (population ratio) does not differ greatly between the phases. However, in the "teaser period", the initial period of the campaign, brand advertising has just begun, and the brand has not yet spread among consumers. Therefore, it is inefficient to allocate a large share of the budget to motivating consumers to repurchase the brand.

Thus, the present systems allow the ratio of allocations to phases to be flexibly varied throughout a campaign period. For example, in the "teaser period", the level of recognition of the advertised brand is low since the campaign has just begun. Accordingly, the budget is selectively allocated to the "daily phase" for recognizing the brand, and not to the "repurchase" phase for remembering the brand. On the other hand, in the "development period", a large number of consumers are expected to have come in contact with the brand advertisement. Thus, a large share of the budget is desirably allocated to the "repurchase phase" for remembering the brand, while omitting allocation to the "daily phase" for brand recognition. FIG. 8 shows an example of budget allocation: in the "teaser period" allocation is daily phase:purchase phase:repurchase phase=2:1:0; for the "introduction period" allocation is daily phase:purchase phase:repurchase phase=1:1:1; and for the "development period", allocation is daily phase:purchase phase:repurchase phase=0:1:2.

Further, depending on the calendar periods to which the "teaser period", "introduction period", and "development period" correspond, the ratio of prospective consumers (the population ratio) in each phase corresponding to FIG. 7 can be determined from year-round monthly statistics prepared in advance. Accordingly, for example, by specifying a campaign period (for example, April to June), a budget can be determined for each month, depending on the population ratio of each phase in those months.

Alternatively, without making a detailed plan for the entire campaign period, a plan can be made only for the "teaser period". As the results of the advertising campaign are surveyed in real time, the budget allocation for the next planned period can be determined on the basis of the population ratio of each phase in the current period. Thus, planning can be sequential.

INDUSTRIAL APPLICABILITY

In the present invention, ContactPoints can be selected and budgets can be distributed among the ContactPoints by using indices that can more truly reflect advertising effect, instead of using a simplified index such as contact rate.

The indices used in the present invention take into account the ContactPoint power, doer's ratio, and affinity for consumers' moods. Consequently, the indices of the present invention reflect the four factors—time, place, scene, and mood—which affect advertising effect. Therefore, the indices enable advertising effect to be sufficiently precisely evaluated, and also not only enable ContactPoints to be selected, but also allow specific vehicles for the selected ContactPoints to be determined.

Moreover, advertisement plans can be made for entire campaign periods, or flexibly varied in accordance with the actual progress of a campaign.

Thanks to these functions, the present systems are useful for navigating the ContactPoints between communication targets (brands) and prospective consumers. The present systems are expected to be used as support tools for planning advertising campaigns.

The invention claimed is:

1. A method of ContactPoint navigation for carrying out navigation for a ContactPoint producing a high advertising effect by a computer, which has at least an arithmetic operation function and an input/output function, and which can gather information from a general database of prospective consumers, executing the steps of: setting phases corresponding to an article type to which a brand belongs; extracting a prospective consumer that matches an attribute of a target prospective consumer from the general database of prospective consumers; determining a phase to which an individual extracted prospective consumer belongs; setting a time slot suitable for contact with the extracted prospective consumer for each phase; selecting one or more ContactPoints for each phase which are suitable for transmitting information to the prospective consumer belonging to each phase and which can more often contact the prospective consumer; and outputting the ContactPoint selected for each phase.

2. A method of ContactPoint navigation for carrying out navigation for a ContactPoint producing a high advertising effect by a computer, which has a general database of prospective consumers, a database of article information, and at least an arithmetic operation function and an input/output function and which can gather information from these databases, executing the steps of:

receiving an article type to which a brand belongs; receiving an attribute of a target prospective consumer;

using the article information database to determine a purchase process corresponding to the article type to set phases appropriate to the purchase process;

selecting as a target population a prospective consumer that matches an attribute of a prospective consumer, and gathering information on the prospective consumer including at least information on a level of brand involvement;

determining a phase to which an individual prospective consumer in the target population belongs, on the basis of the information on the level of brand involvement;

determining a time slot suitable for contacting the target population for each phase;

calculating a ContactPoint power for each phase on the basis of one, or a combination of, a ContactPoint potential index, a ContactPoint-wise contact rate index, and a ContactPoint/mood affinity index in each target population;

selecting at least one ore more ContactPoints for each phase in order of magnitude of ContactPoint power; and outputting the ContactPoints selected for each phase.

3. The method of ContactPoint navigation of claim 2, further comprising the steps of:

receiving a communication budget;

allocating a communication budget to each phase according to the number of prospective consumers in each target population for each phase;

distributing the budget for a phase among the selected ContactPoints, according to the ContactPoint power values of the ContactPoints; and outputting the budget for a selected ContactPoint.

4. The method of ContactPoint navigation of claim 3, comprising further execution of the steps of equally distributing a budget for a phase among the selected ContactPoints, and outputting the budget for each of the selected ContactPoints.

5. The method of ContactPoint navigation of claim 3, comprising further execution of a step of selecting one or more vehicles relating to the selected ContactPoints, in order of contact rate index (CR), within the budget for each ContactPoint.

6. The method of ContactPoint navigation of claim 3, comprising further execution of the steps of:
distributing the budget for each ContactPoint among the vehicles relating to the selected ContactPoints, which have a contact rate index (CR) equal to or larger than a threshold, according to the ratio of each contact rate index, to the total value of the contact rate indices of the vehicles; and
outputting the budget for each vehicle.

7. The method of ContactPoint navigation of claim 2, wherein the mood affinity index MAI(t) is obtained by deriving a weighted average value of affinity indices using Equation (II), on the basis of a share (share (t, m)) of each mood type for the target population and a media/mood affinity index (affinity(m))/

$$MAI(t) = \sum_{m=m_1}^{m_{10}} [share(t, m) \times affinity(m)]. \quad (II)$$

(m: mood (mode) type; ten types)

8. The method of ContactPoint navigation of claim 2, wherein the ContactPoint potential (CP-Potential (p)) is determined by gathering and compiling information on the contribution of each media serving as a means for article information recognition in each phase, from the database of target populations.

9. The method of ContactPoint navigation of claim 2, wherein the step of determining a time slot suitable for contacting the target population for each phase determines, for each phase, a time slot in which a proportion of prospective consumers belonging to a target population who can receive the information appropriate to the phase is equal to or more than a predetermined threshold, to be a time slot suitable for contacting the target population.

10. The method of ContactPoint navigation of claim 2, wherein the step of determining a time slot suitable for contacting the target population for each phase comprises at least the steps of:
displaying, for each phase, a time slot in which the proportion of prospective consumers belonging to a target population who can receive information appropriate to the phase is equal to or more than a predetermined threshold; and
arbitrarily selecting and inputting one or more of the displayed timeslots for each phase.

11. The method of ContactPoint navigation of claim 2, wherein the communication budget is a share of a total communication budget for an entire campaign period, for each of a number of planned periods into which the entire campaign period is divided, and wherein the communication budget is determined to be distributed among the phases such that as the planned period is closer to the beginning of the campaign period, a larger share of the budget is allocated to an early phase of a purchase process, while a smaller share of the budget is allocated to a later phase of the purchase process, or such that as the planned period is closer to the end of the campaign period, a smaller share of the budget is allocated to an early phase of a purchase process, while a larger share of the budget is allocated to a later phase.

12. The method of ContactPoint navigation of claim 2, wherein the communication budget is a share of a total communication budget for an entire campaign period, for each of a number of planned periods into which an entire campaign period is divided, and wherein each of the communication budgets is obtained by distributing the total communication budget according to the ratio of the number of prospective consumers that match an attribute of a prospective consumer for each phase during each planned period, to the total number of prospective consumers that match an attribute of a prospective consumer for all the planned periods and for all the phases, and then adding these budgets for each phase of the purchase process.

13. The method of ContactPoint navigation of claim 2, wherein the communication budget is a share of a total communication budget for an entire campaign period, for each of a number of planned periods into which an entire campaign period is divided, and wherein each of the communication budgets is obtained by estimating the number of prospective consumers during a corresponding planned period on the basis of year-round transition statistics for the number of prospective consumers that match an attribute of a prospective consumer, and then distributing the total communication budget according to the ratio of the estimated number of prospective consumers to the estimated total number of prospective consumers during the entire planned period.

14. A method of ContactPoint navigation for carrying out navigation for ContactPoints producing a high advertising effect by a computer, which has a general database of prospective consumers, a database of article information, and at least an arithmetic operation function and an input/output function and which can gather information from these databases, executing the steps of:
receiving an article type to which a brand belongs;
receiving an attribute of a target prospective consumer;
using the database of article information to determine a purchase process corresponding to the article type to set phases appropriate to the purchase process;
selecting as a target population a prospective consumer that matches an attribute of a prospective consumer, and gathering information on the prospective consumer including at least information on a level of brand involvement;
determining a phase to which an individual prospective consumer in the target population belongs, on the basis of the information on the level of brand involvement;
determining a time slot (t1, t2) suitable for contacting the target population for each phase;
acquiring a ContactPoint potential (CP-Potential (p)) for each ContactPoint for each phase from the database of target populations;
acquiring a performer rate index (MCR(t)) for each ContactPoint for each time slot from the database of target populations;
acquiring a mood affinity index (MAI(t)) for each ContactPoint for each time slot from the database of target populations;
calculating ContactPoint power (CP-Power(p)) for each ContactPoint for each phase for the target population using Equation (I);

selecting at least one or more ContactPoints for each phase in order of magnitude of ContactPoint power (CP-Power (p)); and outputting the ContactPoints selected for each phase $$\text{CP-Power}(P) = \text{CP-Potential}(P) \times \int_{t_1}^{t_2} [\text{MCR}(t) \times \text{MAI}(t)] \, dt \quad (I).$$

15. A method of ContactPoint navigation for carrying out navigation on ContactPoints producing a high advertising effect by a computer, which has a general database of prospective consumers, a database of article information, and at least an arithmetic operation function and an input/output function and which can gather information from these databases, executing the steps of:

receiving an article type to which a brand belongs;
receiving an attribute of a target prospective consumer;
receiving a communication budget;
using the database of article information to determine a purchase process corresponding to the article type to set phases appropriate to the purchase process;
selecting as a target population a prospective consumer that matches an attribute of a prospective consumer, and gathering information on the prospective consumer including at least information on a level of brand involvement;
determining a phase to which an individual prospective consumer in the target population belongs, on the basis of the information on the level of brand involvement;
determining a time slot suitable for contacting the target population for each phase;
allocating a communication budget to each phase according to the total number of prospective consumers gathered as a target for each phase;
determining the number of ContactPoints for each phase according to the budget for each phase; calculating a ContactPoint potential index, an average ContactPoint-wise contact rate index in the time slot, and an average ContactPoint/mood affinity index in the time slot, for the target population and for each ContactPoint;
ranking the ContactPoints for each index according to their index values;
selecting, for each index, a determined number of ContactPoints starting from the highest ranked ContactPoint;
finally selecting only the ContactPoints selected for all or a number of indices; and
outputting the ContactPoints finally selected for each phase.

16. A method of ContactPoint navigation for carrying out navigation on ContactPoints producing a high advertising effect by a computer, which has a general database of prospective consumers, a database of article information, and at least an arithmetic operation function and an input/output function and which can gather information from these databases, executing the steps of:

receiving an article type to which a brand belongs;
receiving an attribute of a target prospective consumer;
receiving a communication budget;
using the database of article information to determine a purchase process corresponding to the article type to set phases appropriate to the purchase process;
selecting as a target population a prospective consumer that matches an attribute of a prospective consumer, and gathering information on the prospective consumer including at least information on a level of brand involvement;
determining a phase to which an individual prospective consumer in the target population belongs, on the basis of the information on the level of brand involvement;
determining a time slot suitable for contacting the target populations for each phase;
allocating a communication budget to each phase according to the ratio of prospective consumers in each phase to total prospective consumers in the target population;
determining a final selection number of ContactPoints for each phase according to the budget for each phase, and setting such a primary limiting quantity and a secondary limiting quantity as a lead to the final selection quantity;
calculating a ContactPoint potential index, an average ContactPoint-wise contact rate index in the time slot suitable for the target population, and an average ContactPoint/mood affinity index in the time slot suitable for the target population, for each ContactPoint;
using one of the indices to select the primary limiting quantity of ContactPoints starting from one with the highest index value
using one of the indices, except the one used for the primary limitation, to select the secondary limiting quantity of ContactPoints from those remaining after the primary limitation, starting from one with the highest index value;
using one of the indices, except those used for the primary and secondary limitations, to select the selection number of ContactPoints from those remaining after the secondary limitation, starting from one with the highest index value;
outputting the ContactPoints selected for each phase.

17. A ContactPoint navigation system comprising: a general database of prospective consumers which searchably stores information on prospective consumers, a database on article information which searchably stores correlations between article types and purchase processes and phase settings, and a computer which can gather information from these databases, and wherein the computer comprises:

a receiving means for receiving an article type to which a brand belongs and an attribute of a target prospective consumer;
an output means for outputting navigation information on ContactPoints;
a phase setting means for determining a purchase process corresponding to the article type using the database of article information, to set phases appropriate to the purchase process;
a work area reserving means for reserving an area in which information on a prospective consumer matching an attribute of a prospective consumer is stored so as to enable processing for each phase;
a database of target populations forming a means for retrieving a prospective consumer matching an attribute of a prospective consumer from the general database of prospective consumers, gathering information on the prospective consumer including at least information on a level of brand involvement, and storing the gathered information in the work area;
a phase determining means for determining a phase to which an individual prospective consumer in the target population belongs on the basis of the level of brand involvement;
a time slot determining means for determining, for each phase, a time slot suitable for contacting with a target population;
a ContactPoint power calculating means for calculating, for the target population, a ContactPoint power for each phase on the basis of one, or a combination of, a ContactPoint potential index, an average ContactPoint-wise contact rate index in the time slot, and an average ContactPoint/mood affinity index in the time slot; and means for selecting at least one or more ContactPoints for each phase in order of magnitude of the ContactPoint power, and wherein the system carries out navigation on the ContactPoints producing a high advertising effect.

18. The ContactPoint navigation system of claim 17, wherein the receiving means further receives a communication budget, and wherein the output means further outputs the budgets for each of the determined ContactPoints, and wherein the system further comprises:

a phase-wise communication budget allocating means for allocating a communication budget to each phase according to the number of targets for each phase gathered in each database of target populations; and a ContactPoint-wise communication budget allocating means for distributing the budget for the phases among the selected ContactPoints according to values for the ContactPoint power of each ContactPoint, and wherein the system carries out navigation on the ContactPoints producing a high advertising effect.

19. The ContactPoint navigation system of claim 18, further comprising a ContactPoint-wise budget allocating means for equally distributing a budget for a phase among the selected ContactPoints, wherein the output means also outputs a budget for each of the selected ContactPoints.

20. The ContactPoint navigation system of claim 18, further comprising a vehicle selecting means for selecting at least one or more vehicles relating to the selected ContactPoints in order of contact rate index (CR) within the budget for each ContactPoint.

21. The ContactPoint navigation system of claim 18, further comprising a vehicle-wise budget allocating means for distributing the budget for each ContactPoint among vehicles relating to the selected ContactPoints, which have a contact rate index (CR) equal to or larger than a threshold, according to the ratio of each contact rate index to the total value of the contact rate indices, and wherein the output means also outputs a budget for each vehicle.

22. The ContactPoint navigation system of claim 17, wherein the mood affinity index MAI(t) is obtained by deriving a weighted average value of affinity indices using Equation (II) on the basis of a share (share (t, m)) of each mood type for the targets and a media/mood affinity index (m)/

$$MAI(t) = \sum_{m=m_1}^{m_{10}} [share(t, m) \times affinity(m)]. \quad (II)$$

(m: mood (mode) type; ten types)

23. The ContactPoint navigation system of claim 17, wherein the ContactPoint potential (CP-Potential (p)) is determined by gathering and compiling information from the database of target populations on the contribution of each media serving as a means for article information recognition in each phase.

24. The ContactPoint navigation system of claim 17, wherein the time slot determining means for determining, for each phase, a time slot suitable for contacting the target population determines, for each phase, a time slot in which the ratio of prospective consumers matching a prospective consumer attribute in each phase to the total number of prospective consumers matching an attribute of a prospective consumer exceeds a threshold, to be a time slot suitable for contacting the target population.

25. The ContactPoint navigation system of claim 17, wherein the time slot determining means for determining, for each phase, a time slot suitable for contacting the target population comprises at least:

a candidate time slot displaying means for displaying, for each phase, time slots in which the ratio of prospective consumers matching an attribute of a prospective consumer in each phase to the total number of prospective consumers matching an attribute of a prospective consumer exceeds a threshold, and a time slot selecting means for arbitrarily selecting and inputting one or more of the displayed time slots for each phase.

26. The ContactPoint navigation system of claim 17, wherein the communication budget is a share of a total communication budget for an entire campaign period, for each of a number of planned periods into which an entire campaign period is divided, wherein the communication budget is determined to be distributed among the phases so that as the planned period is closer to the beginning of a campaign period, a larger share of the budget is allocated to an early phase of a purchase process, while a smaller share of the budget is allocated to a latter phase of the purchase process, or so that as the planned period is closer to the end of the campaign period, a smaller share of the budget is allocated to an early phase of a purchase process, while a larger share of the budget is allocated to a later phase.

27. The ContactPoint navigation system of claim 17, wherein the communication budget is a share of a total communication budget for an entire campaign period, for each of a number of planned periods into which an entire campaign period is divided, and wherein each of the communication budgets is obtained by distributing the total communication budget according to the ratio of the number of prospective consumers that match an attribute of a prospective consumer for each phase during each planned period to the total number of prospective consumers that match an attribute of a prospective consumer for all the planned periods and for all the phases, and then adding these budgets for each phase of the purchase process.

28. The ContactPoint navigation system of claim 17, wherein the communication budget is a share of a total communication budget for an entire campaign period, for each of a number of planned periods into which an entire campaign period is divided, and wherein each of the communication budgets is obtained by estimating the number of prospective consumers during a corresponding planned period on the basis of year-round transition statistics for the number of prospective consumers that match an attribute of a prospective consumer, and then distributing the total communication budget according to the ratio of the estimated number of prospective consumers during the corresponding planned period to the estimated total number of prospective consumers during the entire planned period.

29. A ContactPoint navigation system comprising: a general database of prospective consumers which searchably stores information on prospective consumers, a database of article information which searchably stores correlations between article types and purchase processes and phase settings, and a computer which can gather information from the databases and wherein the computer comprises:

a receiving means for receiving an article type to which a brand belongs and an attribute of a target prospective consumer;

an output means for outputting navigation information on ContactPoints;

a phase setting means for determining a purchase process corresponding to the article type using the database of article information, to set phases appropriate to the purchase process;

a work area reserving means for reserving an area in which information on a prospective consumer matching an attribute of a prospective consumer is stored so as to enable processing for each phase;

a database of target populations forming a means for retrieving a prospective consumer matching an attribute of a prospective consumer from the general database of prospective consumers, gathering information on the prospective consumer including at least information on a level of brand involvement, and storing the gathered information in the work area;

a phase determining means for determining a phase to which an individual prospective consumer in the target population belongs on the basis of the level of brand involvement;

a time slot determining means for determining, for each phase, a time slot (h, t2) suitable for contacting a target population;

a ContactPoint potential calculating means for acquiring a ContactPoint potential (CP-Potential (p)) for each phase for each ContactPoint from the database of target populations;

a performer rate index calculating means for acquiring a performer rate index (MCR(t)) for each time slot for each ContactPoint from the database of target populations;

a mood affinity index calculating means for acquiring a mood affinity index (MAI(t)) for each time slot for each ContactPoint from the database of target populations;

a ContactPoint power calculating means for calculating ContactPoint power (CP-Power(p)) for each phase for the target population for each ContactPoint using Equation (1); and a ContactPoint selecting means for selecting at least one or more ContactPoints suitable for each phase in order of magnitude of the ContactPoint power (CP-Power(p)), and wherein the system carries out navigation on the ContactPoints producing a high advertising effect $$CP-Power(P) = CP-Potential(P) \times \int_{t_1}^{t_2} [MCR(t) \times MAI(t)]dt. \quad (1)$$

30. A ContactPoint navigation system comprising: a general database of prospective consumers which searchably stores information on prospective consumers, a database of article information which searchably stores correlations between article types and purchase processes and phase settings, and a computer which can gather information from the databases, wherein the computer comprises:

a receiving means for receiving an article type to which a brand belongs, and an attribute of a target prospective consumer;

an output means for outputting navigation information on ContactPoints;

a phase setting means for determining a purchase process corresponding to the article type using the database of article information, to set phases appropriate to the purchase process;

a work area reserving means for reserving an area in which information on a prospective consumer matching an attribute of a prospective consumer is stored so as to enable processing for each phase;

a database of target populations forming a means for retrieving a prospective consumer matching an attribute of a prospective consumer from the general database of prospective consumers, gathering information on the prospective consumer including at least information on a level of brand involvement, and storing the gathered information in the work area;

a phase determining means for determining phases to which the prospective consumers in the target population belong on the basis of the level of brand involvement;

a time slot determining means for determining, for each phase, a time slot suitable for contacting the target populations;

an index calculating means for calculating a ContactPoint potential index, an average ContactPoint-wise contact rate index in the time slot, and an average ContactPoint/mood affinity index in the time slot, for the target population and for each ContactPoint;

an index-wise ranking means for ranking the ContactPoints for each index according to their index values;

an index-wise ContactPoint selecting means for selecting a quantity of the ContactPoints for each index, starting from the highest ranked ContactPoint; and a final ContactPoint selecting means for finally selecting only the ContactPoints selected for all or a number of indices, and wherein the system carries out navigation on the ContactPoints producing a high advertising effect.

31. A ContactPoint navigation system comprising: a general database of prospective consumers which searchably stores information on prospective consumers, a database of article information which searchably stores correlations between article types and purchase processes and phase settings, and a computer which can gather information from the databases, wherein the computer comprises:

a receiving means for receiving an article type to which a brand belongs, and an attribute of a target prospective consumer;

an output means for outputting navigation information on ContactPoints;

a phase setting means for determining a purchase process corresponding to the article type using the database of article information, to set phases appropriate to the purchase process;

a work area reserving means for reserving an area in which information on a prospective consumer matching an attribute of a prospective consumer is stored so as to enable processing for each phase;

a database of target populations forming means for retrieving a prospective consumer matching an attribute of a prospective consumer from the general database of prospective consumers, gathering information on the prospective consumer including at least information on a level of brand involvement, and storing the gathered information in the work area;

a phase determining means for determining the phases to which the individual prospective consumers in the target population belong on the basis of the level of brand involvement;

a time slot determining means for determining, for each phase, a time slot suitable for contacting a target population;

a budget allocating means for allocating a communication budget to each phase according to the ratio of the number of prospective consumers in each phase to the total number of prospective consumers in a target population;

a limiting quantity setting means for determining a final selection quantity of ContactPoints for each phase according to the budget allocated to each phase, and setting such a primary limiting quantity and a secondary limiting quantity as a lead to the final selection quantity;

a phase-wise index calculating means for calculating a ContactPoint potential index, an average ContactPoint-wise contact rate index in the target time slot, and an average ContactPoint/mood affinity index in the target time slot, for a target population and for each ContactPoint;

a primary limiting means for using one of the indices to select a primary limiting quantity of ContactPoints starting from the one with the highest index value;

a secondary limiting means for using one of the indices, except the one used for the primary limitation, to select a secondary limiting quantity of ContactPoints from those remaining after the primary limitation, starting from the one with the highest index value; and a final ContactPoint selecting means for using one of the indices, except those used for the primary and secondary limitations, to select a selection quantity of ContactPoints from those remaining after the secondary limitation, starting from the one with the highest index value.

* * * * *

UNITED STATES PATENT AND TRADEMARK OFFICE
CERTIFICATE OF CORRECTION

PATENT NO. : 7,644,012 B2
APPLICATION NO. : 10/558455
DATED : January 5, 2010
INVENTOR(S) : Ishigai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-first Day of December, 2010

David J. Kappos
*Director of the United States Patent and Trademark Office*